United States Patent [19]

Youngren

[11] 4,143,617
[45] Mar. 13, 1979

[54] ROCKET MOTOR LIFE INDICATOR

[75] Inventor: Fred R. Youngren, Lexington, Mass.

[73] Assignee: Raytheon Company, Lexington, Mass.

[21] Appl. No.: 771,059

[22] Filed: Feb. 16, 1977

[51] Int. Cl.² ............................................... G01K 1/02
[52] U.S. Cl. .......................................... 73/358; 73/35; 116/218
[58] Field of Search ................ 60/253, 254, 255, 256; 102/49.3-49.7; 73/35, 167, 358; 116/114.5

[56] References Cited

U.S. PATENT DOCUMENTS 3,090,862  5/1963  Berk .................................. 73/358 X
3,965,741  6/1976  Wachtell et al. .................. 73/358 X Primary Examiner—Verlin R. Pendegrass
Attorney, Agent, or Firm—Philip J. McFarland; Joseph D. Pannone

[57] ABSTRACT

Forms of an indicator attached to the casings of rocket motors in the field to show the readiness of rocket motors using solid fuel are described. Each form described includes a viscous material, as for example a wax, disposed in a chamber and a spring-loaded member which moves in accordance with changes in ambient temperature over a period of time. The amount of movement is analogous to change in the characteristics of the solid fuel.

3 Claims, 2 Drawing Figures

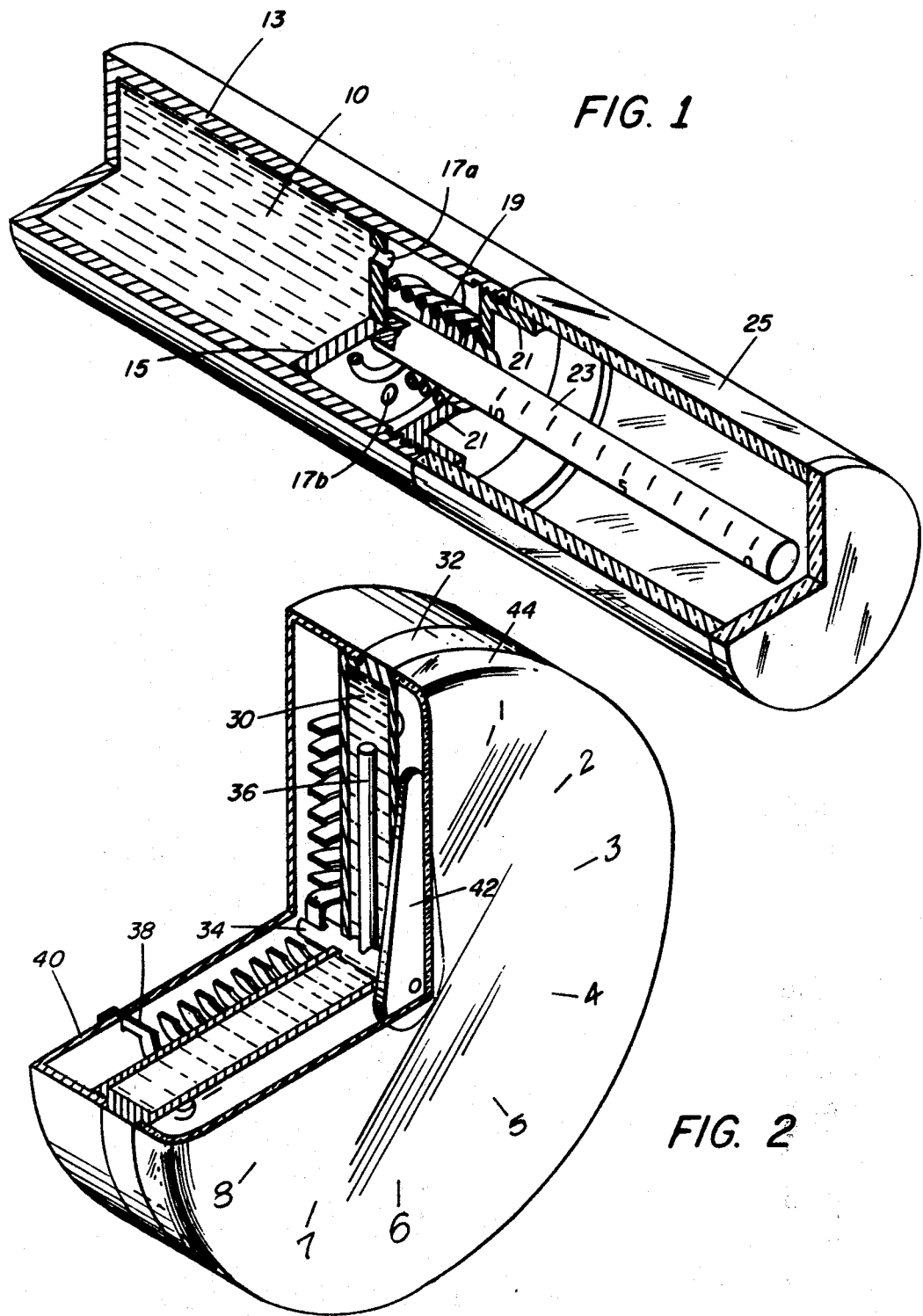

ROCKET MOTOR LIFE INDICATOR

The invention herein described was made in the course of or under a contract or subcontract thereunder, with the Department of Defense.

BACKGROUND OF THE INVENTION

This invention pertains generally to test equipment and particularly to equipment to indicate the readiness of a rocket motor to be fired.

It has been standard practice for some number of years to provide "certified" rounds of the HAWK missile (a standard ground-to-air defense missile of the United States Army and many allies). A certified round is a missile which, because of the methods used in manufacturing each missile and the protection provided for the working parts of the missile, is guaranteed to operate properly in the field.

Unfortunately, however, there is no practical way in which the solid fuel in a rocket motor such as is used in the HAWK missile may be protected against the deleterious effect of changes in ambient temperature over a period of years. In particular, when a certified round is emplaced in an area where it is subjected over a period of years to ambient temperatures, such as are ordinary in a tropical or semitropical country, the solid fuel in the rocket motor becomes unstable and may not be burned in the desired manner. In order to maintain the status of each HAWK missile as a certified round, it is, therefore, necessary periodically to change the solid fuel in the rocket motor. Obviously, such a change should be scheduled only after the solid fuel in the rocket motor has been subjected to elevated temperatures for a sufficient period of time to cause a significant change in the characteristics of such fuel.

It has been proposed that a record be kept of the temperature and duration of time at any elevated temperature to which each HAWK missile is subjected in the field and then, with such a record, determining whether or not the characteristics of the solid fuel have deteriorated to any significant degree. It is evident, however, that such an approach to the scheduling of periodic maintenance entails some risk in that the records for each HAWK missile must be separately maintained over a long period of time as the location of the missile is changed to meet different tactical situations.

SUMMARY OF THE INVENTION

In view of the foregoing, it is a principal object of this invention to provide an integrating indicator which is responsive to ambient temperature to show the condition of solid fuel in a rocket motor.

Another object of this invention is to provide an integrating indicator as above, such indicator being inexpensive to manufacture and simple to use in the field.

The foregoing and other objects of this invention are attained generally by providing an integrating indicator comprising the combination of (a) a mass of a material whose viscosity decreases with an increase in temperature, such material being disposed within a chamber; (b) a spring-loaded body supported within the chamber to bear against, or to be immersed in, the mass, the position of such body being determined by temperature-induced changes in the viscosity of the mass of material within the chamber; and (c) indicating means, external of the chamber and actuated by changes in position of the body in the chamber, for showing the amount of heating of the mass of material within the chamber over a period of time. With a proper calibration of the indicating means an analog of the condition of the solid fuel in the rocket motor of a HAWK missile is obtained.

BRIEF DESCRIPTION OF THE DRAWINGS

For a more complete understanding of this invention reference is now made to the following description of a preferred embodiment as illustrated in the accompanying drawings, wherein:

FIG. 1 is an isometric view, partially cut away, of an integrating indicator according to a first embodiment of this invention; and FIG. 2 is an isometric view, partially cut away, of an integrating indicator according to a second embodiment of this invention.

DESCRIPTION OF THE PREFERRED EMBODIMENT

Referring now particularly to FIG. 1, it may be seen that a mass 10 of a material (types of which will be identified hereinafter) is disposed within a cylindrical chamber 13. Suffice it to say here that the material making up the mass 10 is a material (such as paraffin which is a particular type of material referred to herein as a "wax") which is, in effect, a solid at room temperature but which becomes a viscous liquid at higher temperatures. A plunger 15, here having two orifices 17a, 17b formed therethrough is slidably mounted within the cylindrical chamber 13. The plunger 15 is forced against the mass 10 by a spring 19 which, in turn, is disposed to bear on a collar 21 threaded into the open end of the cylindrical chamber 13. A calibrated rod 23 is affixed in any convenient manner to the plunger 15 to project through an opening (not numbered) in the collar 21. To complete the illustrated embodiment, a transparent cover 25 is positioned as shown on the collar 21.

In operation, the integrating indicator just described is placed in any convenient position near the rocket motor (not shown) of a HAWK missile (not shown). Over a period of time the viscosity of the material in the mass 10 varies with the ambient temperature and with the length of time during which any particular temperature may exist. Each time the viscosity of the material in the mass 10 decreases the plunger 15 is forced by the spring 19 to move deeper into the cylindrical chamber 13, thereby moving the calibrated rod 23 with respect to the collar 21. The orifices 17a, 17b act as relief valves, allowing a portion of the material in the mass 10 to pass through the plunger 15. When the temperature drops, the viscosity of the material in the mass 10 increases to prevent the plunger 15 from moving. Thus, over a period of time the position of the plunger 15 and the position of the calibrated rod 23 relative to the collar 21 is indicative of the number, length and degree of the periods of elevated temperatures to which the mass 10 is subjected. The position of the calibrated rod 23 in turn then is an indication of the state of the solid fuel in the rocket motor.

Referring now to FIG. 2, a second embodiment of this invention is shown to comprise an arrangement wherein operation causes rotational movement of an indicator over a calibrated scale. Thus, in FIG. 2, a mass 30 of a viscous material is disposed within a cylindrical chamber 32. A shaft 34 is journaled as shown to the cylindrical chamber 32. A rod 36, affixed to the shaft 34 in any convenient manner, is immersed in the mass 30. A spring 38 is connected as shown between a slot (not numbered) in the shaft 34 and a slot (not numbered) in the cover plate 40. It will be appreciated that when the cover plate 40 is screwed on to the cylindrical chamber 32 the spring 38 is wound to put a rotational force on the shaft 34. Such force, however, is counteracted by the rod 36 immersed in the mass 30. When the temperature of the viscous material in the cylindrical chamber 32 is elevated, the viscosity of such material is lowered, allowing the rod 36 to be rotated by the spring 38. It will be obvious that the amount of rotation of the rod 36 is a function of both time and temperature and that, over a period of time, the cumulative rotation of the rod 36 is, in effect, an analog of the total amount of heating of the viscous material. To complete the arrangement illustrated in FIG. 2, a pointer 42 is affixed in any convenient manner to the shaft 34, the outer surface (not numbered) of the cylindrical chamber 32 underlying the pointer 42 is calibrated to indicate the rotational position of the rod 36 and a transparent cover 44 is positioned as shown over the pointer 42 and the outer surface of the cylindrical chamber 32.

It will be appreciated that the particular viscous material used in either of the described embodiments may be selected from a large group of materials which exhibit the desired quality of being, in effect, a solid at normal ambient temperatures and a viscous liquid at elevated ambient temperatures that cause solid fuels to become unstable. Such a material, for example, is here a of waxes produced by Roger A. Reed, Inc., 167 Pleasant St., Reading, Mass. 01867. For a mixture which exhibits the desired characteristics for the integrating indicators shown in the Figures, the mixture may be made as follows: (1) 75% a paraffin having a melting point of 165° F and a Saybolt viscosity at 210° F of 50; (2) 20% a paraffin having a melting point between 150° F and 160° F and a Saybolt viscosity at 210° F of 75; and (3) 5% a paraffin having a melting point between 143° F and 150° F and a Saybolt viscosity at 210° F of 42.1. It will be appreciated, however, that there are many other paraffins with different melting points and viscosities which may be blended to obtain any desired melt range and viscosity within wide limits, depending upon the particular desired range of an integrating indicator of the type here contemplated.

Having described a preferred embodiment of this invention, it will now be apparent to one of skill in the art that changes may be made without departing from the concept of using changes in the viscosity with temperature of particular materials to provide an integrating indicator. For example, it would be obvious that the orifices in the embodiment of FIG. 1 need not be formed in the plunger but rather may be formed through the closed end of the cylindrical chamber with the transparent cover placed over that end. The amount of the material passing through such orifices would then provide the desired indication. In such an arrangement the calibrated rod would not be required but rather the transparent cover would be marked. Further, it would be obvious that the embodiment shown in FIG. 2 could easily be adapted to be permanently attached to the casing of a rocket motor without adversely affecting any structural or aerodynamic characteristics. Finally, it would be obvious that both embodiments could be modified to include limit switches actuated by either the calibrated rod 36 of FIG. 1 or the pointer 42 of FIG. 2 to allow the condition of the solid fuel in a rocket motor to be monitored when it is inconvenient or difficult for the indicators to be observed. It is felt, therefore, that this invention should not be restricted to the disclosed embodiment, but rather should be limited only by the spirit and scope of the appended claims.

What is claimed is:

1. For use as an indicator of the stability of solid fuel in a rocket motor, such fuel being susceptible to instability after being subjected to elevated temperatures over an extended period of time, the combination comprising:
   (a) a mass of a material having a viscosity inversely related to the temperature of such material, such material being a mixture of waxes having different melting points, such mixture being 75% a wax with a melting point at 165° F, 20% a wax with a melting point between 150° F and 160° F and 5% a wax with a melting point between 143° F and 150° F;
   (b) a chamber for holding the mass in a confined space adjacent to a rocket motor having solid fuel;
   (c) first means springily connected to the chamber and in contact with the mass, such means being adapted to move only in accordance with any decrease in viscosity of the material in the mass; and
   (d) second means connected to the first means for indicating the position of the first means, such second means thereby also indicating the stability of the solid fuel in the rocket motor.

2. The combination as in claim 1 wherein:
   (a) the chamber is cylindrical having journals formed in facing end walls; and
   (b) the first means is the combination of:
      (i) a shaft passing through the journals;
      (ii) a rod affixed to the shaft and immersed in the mass of material; and
      (iii) a spring bearing on the shaft outside the chamber to exert a rotational force thereon; and
   (c) the second means is a pointer affixed to the shaft outside the chamber for indicating the position of the rod within the chamber.

3. The combination as in claim 1 wherein:
   (a) the chamber is cylindrical, having one open end;
   (b) the first means is the combination of:
      (i) a plunger fitted in the open end of the chamber, such plunger having at least one orifice formed therethrough; and
      (ii) a spring bearing against the plunger to maintain the plunger in contact with the mass of material; and
   (c) the second means is a calibrated rod affixed to the plunger and extending outwardly of the open end of the chamber, the position of such rod relative to the open end of the chamber being indicative of the movement of the plunger.

* * * * *